(12) United States Patent
Deprun

(10) Patent No.: US 8,213,991 B2
(45) Date of Patent: Jul. 3, 2012

(54) MOBILE TERMINAL, ASSOCIATED STORAGE DEVICES AND METHODS OF USING THE SAME

(75) Inventor: Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 12/745,786

(22) PCT Filed: Nov. 25, 2008

(86) PCT No.: PCT/KR2008/006945

§ 371 (c)(1),
(2), (4) Date: Jun. 2, 2010

(87) PCT Pub. No.: WO2009/091117

PCT Pub. Date: Jul. 23, 2009

(65) Prior Publication Data

US 2010/0261464 A1  Oct. 14, 2010

Related U.S. Application Data

(60) Provisional application No. 61/021,485, filed on Jan. 16, 2008.

(51) Int. Cl.
*H04M 1/00* (2006.01)

(52) U.S. Cl. .......... 455/558; 455/556.1; 455/557
(58) Field of Classification Search ............ 455/414.1, 455/418, 433, 432.3, 557, 558, 550.1, 556.1
See application file for complete search history.

(56) References Cited

U.S. PATENT DOCUMENTS

| 6,584,326 | B1 * | 6/2003 | Boydston et al. ............ 455/558 |
| 6,986,466 | B2 | 1/2006 | Vincent |
| 2009/0054104 | A1 * | 2/2009 | Borean et al. ............... 455/558 |

FOREIGN PATENT DOCUMENTS

| EP | 1773039 A1 | 4/2007 |
| WO | WO 2007/034430 A2 | 3/2007 |

* cited by examiner

*Primary Examiner* — Jean Gelin
(74) *Attorney, Agent, or Firm* — Birch, Stewart, Kolasch & Birch, LLP

(57) ABSTRACT

A mobile terminal and its associated storage devices and various methods of controlling and using them are discussed. According to an embodiment, a method for launching an application for a mobile terminal, includes receiving, by a first storage device connected to the mobile terminal, information on a second storage device after the second storage device is connected to the mobile terminal; and accessing, by the first storage device, a content stored in the second storage device based on at least the received information on the second storage device.

2 Claims, 4 Drawing Sheets

[Fig. 1]
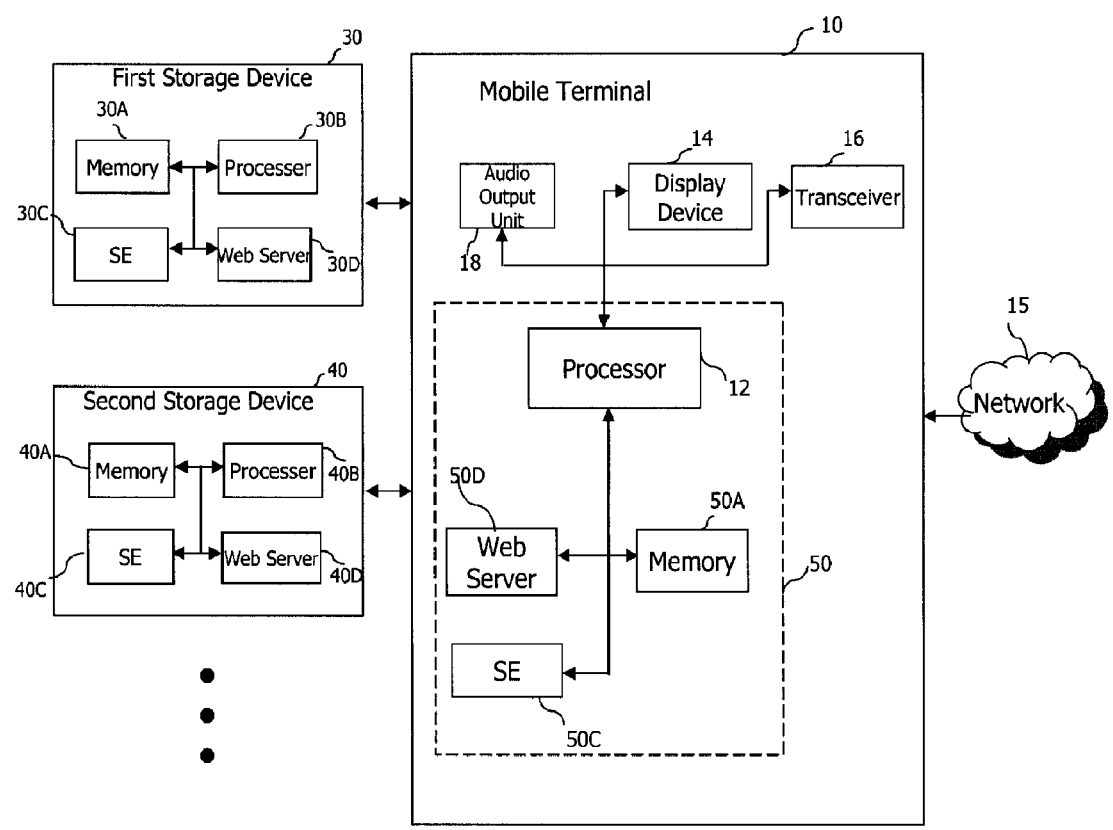

[Fig. 2]
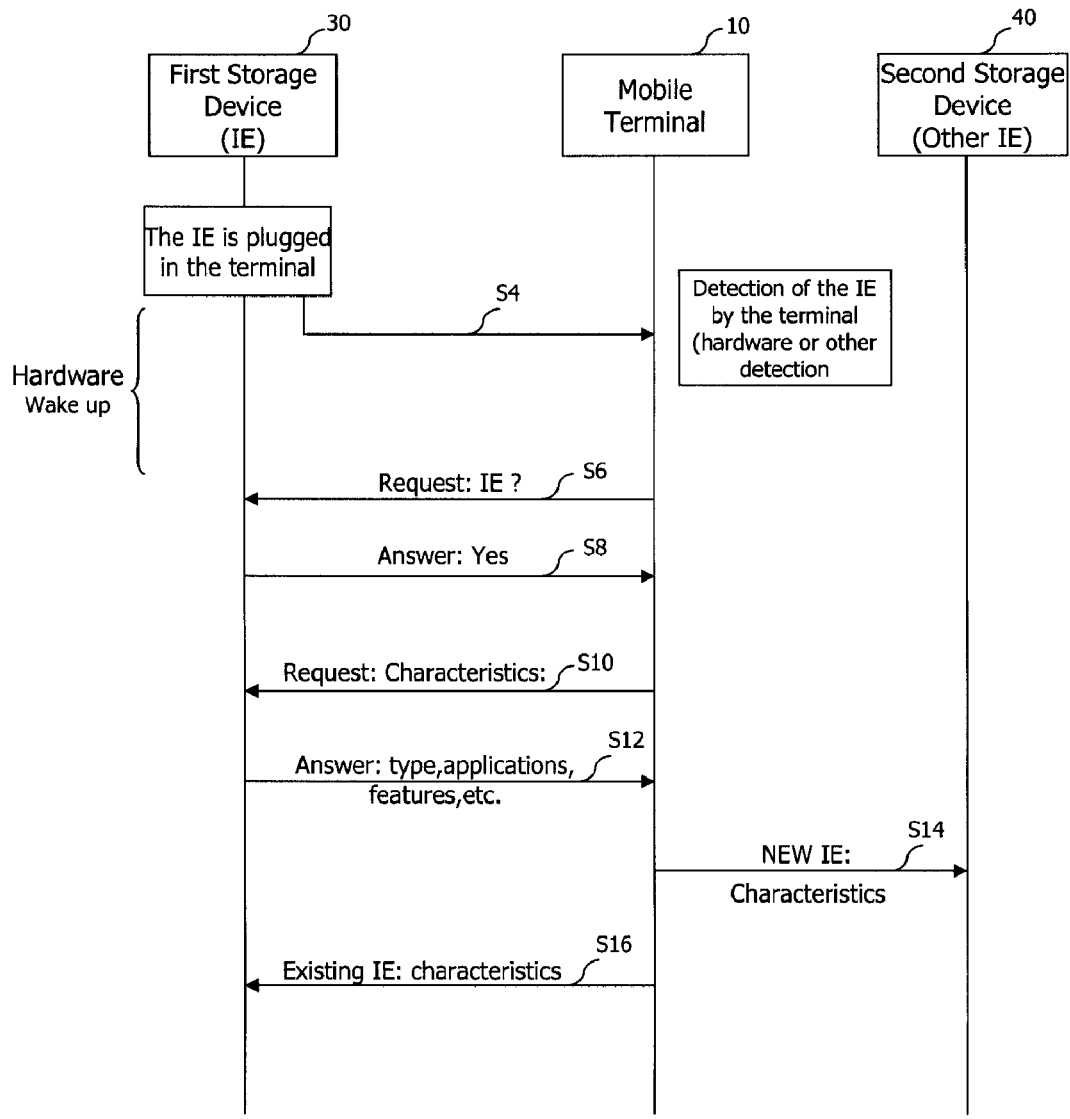

[Fig. 3]
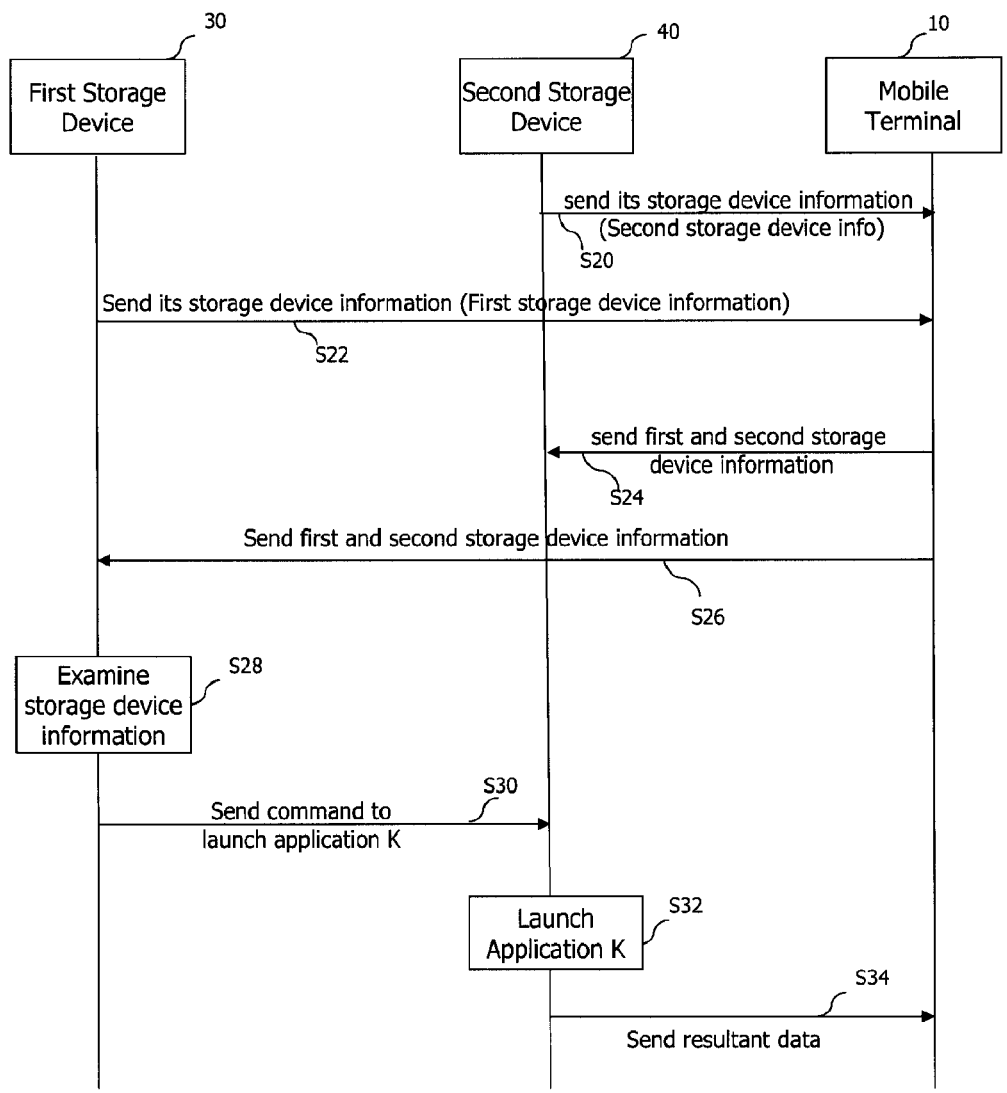

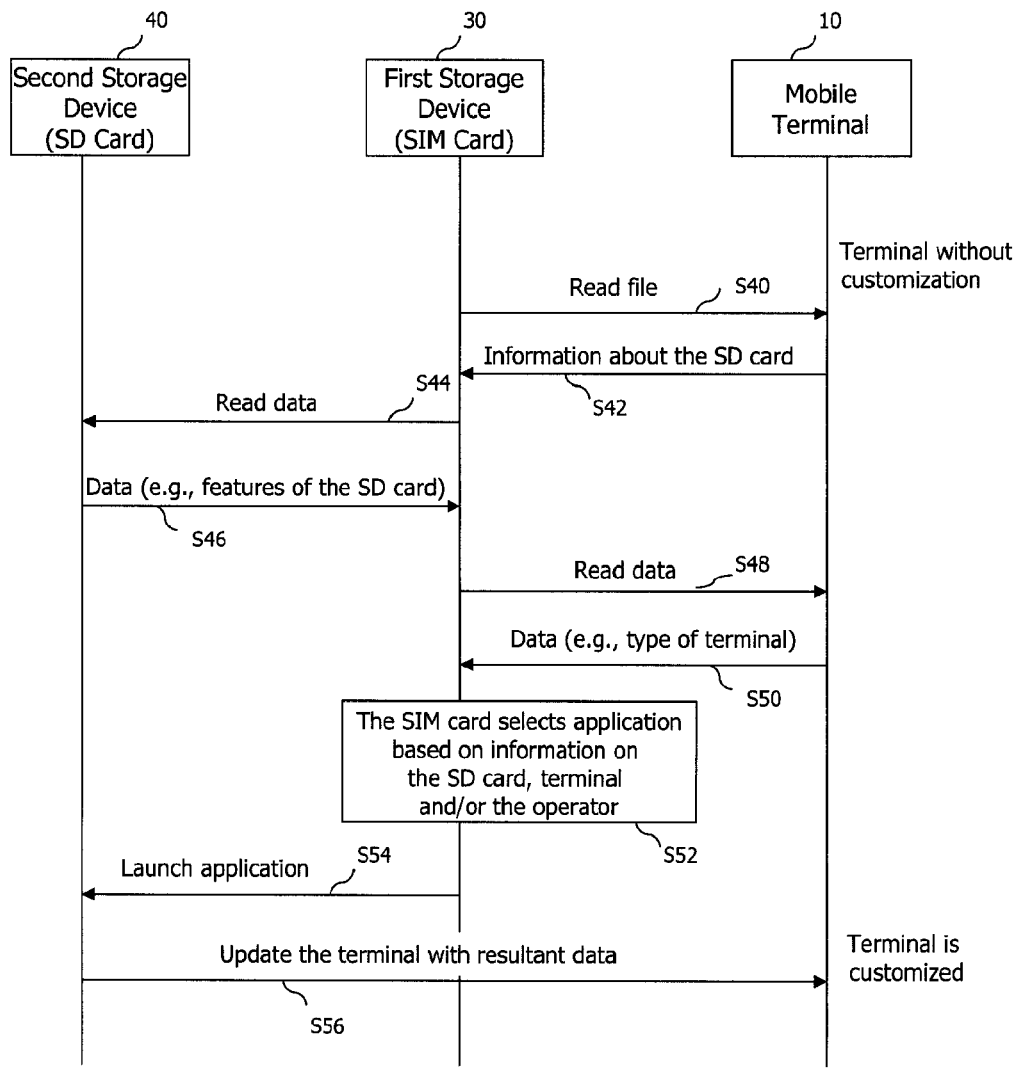

MOBILE TERMINAL, ASSOCIATED STORAGE DEVICES AND METHODS OF USING THE SAME

This application is the National Phase of PCT/KR2008/006945 filed on Nov. 25, 2008, which claims priority under 35 U.S.C. 119(e) to U.S. Provisional Application No. 61/021,485 filed on Jan. 16, 2008. The entire contents of these applications are hereby incorporated by reference into the present application.

TECHNICAL FIELD

The present invention relates to a terminal having multiple storage devices, and more particularly, to a system and method for controlling communication among a mobile terminal and its associated storage devices by sharing information regarding the storage devices.

BACKGROUND ART

Technologies associated with mobile terminals are being rapidly developed and standardized, and such technologies offer better and more sophisticated services and products to end users. In this regard, some service providers and/or mobile terminal manufacturers include a removable storage device known as a SIM (Subscriber Identification Module) card in each of their mobile terminals. SIM cards are used to store subscriber information associated with the mobile terminals, and are advantageous since the service providers can update contents of their SIM cards provided in the mobile terminals using known communication procedures.

According to recent standardization documents of Open Mobile Alliance (OMA), a SIM card having a HTTP/web server can be provided in a mobile terminal. This HTTP server is also referred to as a Smart Card Web Server (SCWS), and is a server that can process HTTP commands according to well known HTTP protocols (e.g., HTTP/1.1).

However, only one single SIM card having the SCWS is allotted per mobile terminal. As a result, it is not possible for a mobile terminal to access and control multiple SIM cards or other types of removable storage devices associated with the mobile terminal. Further, it is not possible for these multiple storage devices to interact with each other through the mobile terminal. Moreover, there is no procedure for one storage device to obtain information on the characteristics and capabilities of another storage device.

DISCLOSURE OF INVENTION

Technical Solution

A technical goal of the present invention is to provide a procedure for sharing information regarding each of multiple storage devices associated with a mobile terminal among the storage devices.

Another technical goal of the present invention is to provide methods for initializing, connecting with, and removing each of storage devices associated with a mobile terminal.

Another technical goal of the present invention is to provide one or more removable storage devices associated with a mobile terminal, each storage device including a processor for managing communications with the other storage device(s), where each storage may or may not include a web server or SCWS.

Another technical goal of the present invention is to provide a mobile terminal and method for detecting presence of a storage device, obtaining information regarding the storage device, and distributing this information to other associated storage devices, whereby communications among the mobile terminal and the storage devices can be provided based on the distributed information.

According to an aspect of the present invention, there is provided a method for launching an application for a mobile terminal, comprising: receiving, by a first storage device connected to the mobile terminal, information on a second storage device after the second storage device is connected to the mobile terminal; and accessing, by the first storage device, a content stored in the second storage device based on at least the received information on the second storage device.

According to another aspect of the present invention, there is provided a method for communicating data using a mobile terminal, comprising: detecting, by the mobile terminal, a connection between the mobile terminal and a first storage device when the first storage device is connected to the mobile terminal; obtaining, by the mobile terminal, information on the first storage device based on the detection result; and transmitting, by the mobile terminal, the obtained information on the first storage device to a second storage device connected to the mobile terminal, whereby the second storage device can communicate with the first storage device based on the obtained information on the first storage device.

According to another aspect of the present invention, there is provided a mobile terminal, comprising: a transceiver configured to transmit or receive signals from another device; and a processor configured to control the transceiver, to detect a connection between the mobile terminal and a first storage device when the first storage device is connected to the mobile terminal, to obtain information on the first storage device based on the detection result, and to provide the obtained information on the first storage device to a second storage device connected to the mobile terminal, whereby the second storage device can communicate with the first storage device through the processor based on the obtained information on the first storage device.

Advantageous Effects

The present invention allows a mobile terminal to detect the presence of a storage device, obtain information regarding the detected storage device, and share this information with other storage device(s) associated with the mobile terminal. As such, each storage device has information regarding the other storage devices such as characteristics and capabilities of the storage devices. Based on this information, then each storage device can initiate a more suitable communication or action with another storage device or the mobile terminal.

Accordingly, the present invention allows resources of the storage devices to be accessed, used, modified and shared among the storage devices and mobile terminal in a more efficient and effective manner.

BRIEF DESCRIPTION OF THE DRAWINGS

FIG. 1 is a block diagram illustrating system architecture of a mobile terminal and its associated storage devices according to an embodiment of the present invention.

FIG. 2 is a flowchart illustrating a method for sharing the storage device information of a storage device with a mobile terminal and other storage device(s) according to an embodiment of the present invention.

FIG. 3 is a flowchart illustrating a method for a mobile terminal and its associated storage devices according to an embodiment of the present invention.

FIG. 4 is a flowchart illustrating a method for a mobile terminal and its associated storage devices according to another embodiment of the present invention.

MODE FOR THE INVENTION

Hereinafter, preferred embodiments of the present invention will be described in detail with reference to the accompanying drawings. The following embodiments should be considered in descriptive sense only and not for purpose of limitation.

FIG. 1 is a block diagram illustrating system architecture of a mobile terminal and its associated storage devices according to an embodiment of the present invention.

Referring to FIG. 1, the system includes a mobile terminal 10 and a plurality of storage devices 30, 40, . . . associated with the mobile terminal 10. The mobile terminal 10 is configured to communicate with another mobile terminal or a network entity such as a server via a communication network 15. The storage devices 30, 40, . . . can be inserted into the mobile terminal 10 or may be connected to the mobile terminal 10 wirelessly or via a wired connector. All the components of the system are operatively coupled and configured.

Each of the storage devices 30, 40, . . . includes a memory 30A, 40A, . . . for storing contents, and a processor 30B, 40B, . . . such as a microprocessor for controlling the respective memory. As such, the storage devices 30, 40, . . . may be herein referred to as an intelligent memory or IE. The contents stored in the storage devices can be any data or information, e.g., information regarding the other storage devices such as their characteristics and/or capabilities, applications/programs, files such as multimedia files, MP3 files, xHTML files, static files, dynamic files, etc., subscriber information, service provider information, video/audio data, etc.

Optionally, a HTTP/web server 30D, 40D, . . . for processing HTTP commands can be further provided in each storage device 30, 40, . . . . The web servers 30D, 40D, . . . are also referred to herein as smart card web servers (SCWSs). Further, optionally each of the storage devices 30, 40, . . . can include a secure element 30C, 40C, . . . which renders the respective storage device as a secure device.

The secure element 30C, 40C, . . . can provide any of the known encryption and decryption modules and/or authentication module for providing more secure data communication between the respective storage device and another entity. For example, the secure elements can use known TLS (Transport Layer Security) protocols for providing secure data communication using public key infrastructure (PKI). That is, according to an embodiment of the present invention, any communication among the storage devices 30, 40, . . . , the mobile terminal 10, and any other entity such as the server 20 or another network entity can be securely provided using known secure data communication techniques.

The storage devices 30, 40, . . . can be any device that includes a memory and a processor. For example, each of the storage devices 30, 40, . . . can be any type of smart card such as SIM, USIM, UICC, R-UIM, CSIM, etc., a SD (Secure Digital) card, a USB device, a MMC (MultiMediaCard) card, a GPS device, a Bluetooth device, etc. A SIM card can be updated by a SIM card operator or service provider with any information via a known method such as an OTA (Over-The-Air) operation. Any number of storage devices can be provided in association with the mobile terminal 10.

For only as a non-limiting example, in FIG. 1, the first and second storage devices 30 and 40 can be a SIM card and a SD card, respectively. In another non-limiting example, the first and second storage devices 30 and 40 can both be SIM cards or SD cards.

The mobile terminal 10 includes a controller or processor 12 such as a micro-processor or application processor, a display device 14 (e.g., LCD panel) for displaying contents, a transceiver 16 for transmitting and receiving various signals, an audio output unit 18 for outputting audio sounds, and an internal memory 50A. Optionally, the mobile terminal 10 can also include a SCWS 50D and/or a SE 50C. The processor 12 and internal memory 50A (with the SCWS 50D and/or SE 50C if present) can constitute a third storage device 50 being one of the storage devices 30, 40, . . . . That is, the processor 12 of the mobile terminal 10 can perform functions of a storage device, similar to the processors 30B and 40B of the other storage devices. The mobile terminal 10 can also include other known components such as a camera module, keypads, touch pads, additional memories, etc.

The processor 12 is configured to detect the presence of a storage device (e.g., storage device 30 or 40) when the storage device is electrically and/or physically connected to the mobile terminal 10, and to request information regarding the detected storage device once the detection is made. For instance, when a new SIM card or SD card is inserted in the mobile terminal 10, the processor 12 detects this insertion and requests information regarding the inserted SIM/SD card from the processor of the SIM/SD card.

The information regarding the storage device 30, 40, . . . is any information associated with the storage device, and is herein also referred to as 'storage device information'. The storage device information can be relied on by any entity in the system of FIG. 1 to make a more informed decision regarding a particular operation that the entity desires to perform or is interested in. The storage device information can be, for example, one or more pieces of at least one of the following information:

1) General information about the storage device such as the type of the storage device, e.g., it is a SD card, SIM card, etc., manufacturer of the storage device, identification information for the storage device, etc.;

2) Information about the components of the storage device such as the type and speed of microprocessor, size and type of memory, manufacturer of the components, etc.;

3) Information about the contents of the storage device such as files and applications stored in the storage device, for instance, types of applications (e.g., NFC applications, RSA or other cryptography applications, data/communication protection applications, banking applications, memory applications, backup applications, video applications, music applications, streaming applications, etc.), manufacturer and version of the applications, capabilities of the applications, etc.; or 4) Information about services associated with the storage device such as subscriber information, service provider information, service information, etc.

The processor 12 of the mobile terminal 10 stores the storage device information regarding the detected storage device in the memory 50A along with the previously collected storage device information regarding other existing associated storage devices. The entire stored storage device information regarding all the associated storage devices can then be sent to each of the associated storage devices, so that each storage device can have the up-to-date storage device information regarding all other associated storage devices. This may be performed periodically or whenever there is a change in the stored storage device information. As an alternative, other methods of providing and updating the storage device information are possible. For instance, the processor 12 may send only the updated/new storage device information regarding any storage device to the applicable associated storage device(s). For instance, when a new SD card is provided to the mobile terminal, the processor 12 can send information regarding only the new SD card to all other existing associated storage devices, and send information regarding all other existing associated storage devices to the new SD card.

The processor 12 of the mobile terminal 10 is also configured to detect a removal/disconnection/shut-down of the associated storage devices and to remove the storage device information for the detected storage device from its internal memory and from the memories of the storage devices 30, 40, . . . . For instance, if the existing SD card is removed from the mobile terminal 10, then the processor 12 detects this removal, and updates the stored storage device information regarding the storage devices (e.g., by removing the storage device information regarding the removed SD card). The processor 12 can also communicate the removal of this SD card to the other storage devices so that the processors in those storage devices can remove the storage device information on the removed SD card from their stored storage device information regarding the storage devices. In the alternative, the processor 12 of the mobile terminal can communicate the already updated storage device information regarding the storage devices to the applicable storage device(s).

Further, each storage device may choose not to share its storage device information with certain other storage devices or other entities. In this regard, passwords/ID or other schemes may be used to discriminate when such storage device information may be shared or may not be shred. For instance, a SIM card may share its storage device information including user ID information with a SD card to launch a banking application, if the SD card sends proper authentication information (e.g., proper SD card ID) to the SIM card.

Once the mobile terminal 10 has the storage device information regarding all associated storage devices and each of the storage devices 30, 40, 50, . . . has the storage device information regarding the other storage devices, the mobile terminal or each storage device can determine a more suitable operation to perform or initiate based on this information, such that operations and communications among the mobile terminal and the storage devices (and any other entity such as a network server or another mobile terminal) can be performed in an optimized, efficient manner.

The mobile terminal 10 can be any device configured to communicate with the storage devices 30, 40, . . . associated with the mobile terminal 10, and with other entities such as a server or another mobile terminal through the network 15. For example, the mobile terminal 10 can be a mobile phone, a smart phone device, a computer notebook, a handset, a user equipment, a mobile station, etc.

In addition, the storage devices 30, 40, 50, . . . can be assigned with different URL (Uniform Resource Locator) addresses, respectively, so that each storage device can be referenced using well known HTTP protocols. In one example of implementation, for each storage device, a unique URL address can be assigned to a slot or connection area allotted for that storage device of the mobile terminal, e.g., one URL address for a SIM card connector of the mobile terminal, another URL address for a SD card connector, etc. In that case, even if the current SIM card in the mobile terminal is replaced with a new SIM card, the same URL address that was used for the old SIM cards can still be used for the new SIM card, which provides continuity to the use of SIM cards.

Using the URL addresses of the storage devices, the mobile terminal 10, any other entity (e.g., the server 20 or other network entity), or each storage device associated with the terminal 10 can reference, access and communicate with each individual storage device. In such cases, having the web servers 30D, 40D, . . . in the storage devices are preferred, but the processor 30B, 40B, . . . may interpret HTTP commands if they are used. For example, the URL address of a specific storage device can be used to trigger or launch applications stored in that storage device. In one example, the processor 30B or web server 30D of the first storage device 30 may send an HTTP command of, e.g., "http://127.0.0.1:3516/cgi/start?launch" (where 127.0.0.1 is the URL address of the second storage device 40) to the second storage device 40 to launch an application stored in the second storage device 40.

In the present application, communications among the different storage devices 30, 40, 50, . . . are discussed according to the present invention. However, it should be noted that any communication between these storage devices would be made always through the processor 12 or other suitable module of the mobile terminal 10.

Now, having described the system architecture of FIG. 1, various methods according to the embodiments of the present invention will be discussed referring to FIGS. 2-4. These methods can be implemented in the system of FIG. 1 or in other suitable devices or system. Further, in FIG. 2, the first and second storage devices (IE and other IE) 30 and 40 can be any storage device, whereas FIGS. 3 and 4, the first and second storage devices 30 and 40 are preferably a SIM card and a SD card, respectively. Further, in FIGS. 2-4, any communication between the first and second storage devices 30 and 40 is always made through the processor 12 of the mobile terminal as mentioned above, where the processor 12 merely functions as a relaying unit.

FIG. 2 illustrates a flowchart for explaining an initialization of a storage device in association with a mobile terminal according to an embodiment of the present invention. In this example, the first storage device (IE) 30 is a new storage device being connected with the mobile terminal 10 while the second storage device (other IE) 40 is an existing storage device already connected with the mobile terminal 10. As such, the mobile terminal 40 stores therein the storage device information pertaining to the second storage device 40.

At step S4 of FIG. 2, when a new IE (e.g., first storage device 30) is inserted in or becomes electrically connected to the mobile terminal 10, the mobile terminal 10 detects the presence of the new IE using known hardware and/or software detection methods.

At steps S6 and S8 which are optional steps, the mobile terminal 10 can request the first storage device 30 (newly detected IE) to confirm that the first storage device 30 is an IE.

At steps S10 and S12, the mobile terminal 10 sends a request for more information, to the first storage device 30, and then receives it from the first storage device 30. Here, the requested information can be any information pertaining to the first storage device 30, i.e., storage device information pertaining to the first storage device 30, e.g., characteristics (capabilities, applications, component types, etc.) of the first storage device 30. Examples of such storage device information have been discussed above in detail and thus are not repeated herein. The received storage device information is stored in the memory 50A of the terminal 10. As a result, the mobile terminal 10 stores therein the storage device information for each of all associated storage devices including the first and second storage device 30 and 40, in this example.

As a variation, instead of the mobile terminal 10 requesting for the storage device information at step S10, the first storage device 30 can be set up so that it transmits its storage device information to the mobile terminal 10 automatically (if not provided previously) once the connection is made to the terminal 10.

At step S14, the mobile terminal 10 sends the storage device information pertaining to the first storage device (new IE) to each of the existing associated storage devices, namely in this example, the second storage device 40.

At step S16, the mobile terminal 10 sends the storage device information pertaining to the existing second storage device (other IE) to the new IE, namely in this example, the first storage device 30.

Steps S14 and 16 can be performed simultaneously or in any order. In another variation, instead of sending only the new information (e.g., in steps S14 and S16), the mobile terminal 10 can compile and update its full storage device information for all currently associated storage devices (which would include both the first and second storage devices), and distribute the same information to each of the first and storage devices. In still another variation, the mobile terminal 10 can send a notice to the second storage device that the first storage device is detected or present, and the second storage device can access the storage device information of the first storage device by a specific command, e.g., READ_FILE_CONF or by reading a specific file (e.g., GET config_IE.text). The first storage device can also do the same to get the storage device information of the second storage device in step S16.

In the above steps of FIG. 2, preferably the processor 12 of the terminal 10 communicate with the processors 30B and 40B of the first and second storage devices in carrying out the steps.

Once the storage device information for the associated storage devices of the mobile terminal is distributed to each of the associated storage devices as shown, e.g., in FIG. 2, then any storage device can examine this information and perform more appropriate operations based on the examination, for example, launch applications.

Furthermore, if an associated storage device is removed or disconnected from the mobile terminal, then the mobile terminal can detect the absence of such storage device and then appropriately update its storage device information (e.g., by removing the storage device information regarding the removed storage device) while communicating the updated information to the existing storage devices.

FIG. 3 is a flowchart for explaining an example of a communication method among a mobile terminal and its associated storage devices according to an embodiment of the present invention. In this example, it is assumed that the first and second storage devices are now connected to the mobile terminal 10 but the mobile terminal 10 does not have their storage device information.

At steps S20 and S22 of FIG. 3, the processor 40B of the second storage device 40 sends the storage device information of the second storage device 40 (referred to herein as the second storage device information) to the terminal 10. Similarly, the processor 30B of the first storage device 30 sends the storage device information of the first storage device 30 (referred to herein as the first storage device information) to the terminal 10. Steps S20 and S22 can be performed simultaneously or in any order. The received first and second storage device information is stored in the mobile terminal 10.

At steps S24 and S26, the mobile terminal 10 sends the collected first and second storage device information to each of the first and second storage devices 30 and 40. As a result, the mobile terminal and its associated storage devices each have the storage device information of all associated storage devices.

At step S28, the first storage device 30 examines the storage device information of the second storage device 40 and determine if a desired operation can be performed. In this example, the first storage device 30 examines the storage device information of the second storage device 40 and recognizes that a particular desired application (e.g., Application K) is stored in the second storage device 40.

As a result, at step S30, the first storage device 30 sends a command to the second storage device 40 to launch Application K in the second storage device 40. For example, the processor 30B or web server 30D (if present) can send a HTTP command to launch Application K using, e.g., the URL address of the second storage device.

At step S32, the second storage device 40 receives the command to launch Application K and launches Application K therein.

At step S34, if any data is obtained from launching or running Application K, such data and any other information can be sent to the mobile terminal 10 (and/or to the first storage device or any other designated entity, e.g., a server or another terminal).

The example of FIG. 3 has various advantageous features, e.g., allowing a small memory size/low interface of a SIM card to take an advantage of a larger memory size/high interface speed of an SD card by running applications in the SD card faster. Further, the first and second storage devices can be removed from its association with the mobile terminal and then can be inserted in any new device to perform the same desired operations such as running specific applications. For example, the SD card can be removed from the existing terminal, and then put into a new phone or other device to launch Application K in the new phone.

Accordingly, the present invention allows the mobile terminal and its associated storage devices to share resources and to perform various operations with enhanced portability, consistency and versatility.

FIG. 4 is a flowchart for explaining an example of a communication method among a mobile terminal and its associated storage devices according to an embodiment of the present invention.

At steps S40 and S42 of FIG. 4, the first storage device 30 reads a file in the mobile terminal 10, where this file contains information regarding all associates storage devices. As a result, the first storage device 30 recognizes that a new SD (second storage device 40) is present and then obtains general information about the second storage device 40 from the mobile terminal 10. Here, the obtained general information may be a part or the entirety of the storage device information of the second storage device 40.

At steps S44 and S46, the first storage device 30 can request additional information about the second storage device 40 from the second storage device 40 if needed, and receive the requested additional information. For instance, the first storage device can request a more detailed specification of the second storage device and/or any other information needed to launch a particular application in the second storage device. In another example, if the obtained storage device information of the second storage device 40 indicates that the second storage device 40 has Application K stored therein, then the first storage device 30 may request more information about Application K.

At steps S48 and S50, the first storage device 30 can also request additional information about the mobile terminal 10. For instance, if a more detailed specification or other information is needed regarding the mobile terminal 10 to launch a particular application in the second storage device 40, the first storage device 30 requests this information from the terminal 10, which may be, e.g., type of terminal, size of screen, specification of music features, etc.). Steps S44-S50 may be optional steps.

At step S52, based on the obtained information such as information on the second storage device 40, information on the terminal 10 and/or information on the operator (e.g., service provider or manufacturer), the first storage device 30 performs a certain operation. For instance, the first storage device 30 can select a desired application to launch. For example, by evaluating various capabilities of all relevant devices and other information (e.g., service provider information, network information, etc.), the first storage device 30 can select a more or most suitable application in the second storage device 40 to launch therein. In another example, the first storage device 30 can access the second storage device 40 by reading a data file stored in the second storage device 40 based on at least the received information on the second storage device (e.g., the information on the second storage device can indicate which directory in the second storage device needs to be accessed to get the data file).

At step S54, the first storage device 30 sends a command to launch the selected application to the second storage device 40. At step S56, data resulting from the running of the application can be sent to the mobile terminal 10 or any other designated entity. For example, parameters (e.g., pictures, ring tones, etc.) or data can result from the application, which can be used to customize the mobile terminal 10.

Accordingly, the invention allows the mobile terminal and its associated storage devices to obtain information regarding each associated storage device and to perform various optimal operations using the obtained information, in an effective manner.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

The present invention may be applicable to a mobile terminal, one or more storage devices associated with the terminal, a network entity associated with the terminal or storage device(s), for accessing, modifying, and controlling contents stored in the storage devices.

The invention claimed is:

1. A method for launching an application for a mobile terminal, comprising:
    reading, by a processor of a SIM (Subscriber Identification Module) card, a file in the mobile terminal, wherein the file contains information related to a SD (Secure Digital) card that is connected to the mobile terminal;
    obtaining, by the processor of the SIM card connected to the mobile terminal, the information related to the SD card after reading the file;
    requesting, by the processor of the SIM card, first additional information to the SD card in order to launch an application in the SD card, wherein the first additional information is related to feature information of the SD card for launching the application;
    requesting, by the processor of the SIM card, second additional information to the mobile terminal in order to launch the application in the SD card, wherein the second additional information is related to feature information of the mobile terminal indicating a type of the mobile terminal and a size of the mobile terminal's screen;
    selecting, by the processor of the SIM card, the application based on the information related to the SD card, the first additional information and the second additional information, wherein the selected application is a most suitable application operable in the SD card after evaluating capabilities of the SD card and the mobile terminal; and
    sending, by the processor of the SIM card, a command to launch the selected application to the SD card, wherein data resulting from running the selected application is forwarded to the mobile terminal such that the mobile terminal can be customized using the resulting data,
    wherein all the above steps are performed when the SIM card and the SD card are connected to the mobile terminal at a same time.

2. An apparatus, comprising:
    a processor configured to perform the following when the apparatus and a SD (Secure Digital) card are connected to a mobile terminal at a same time:
    reading a file in the mobile terminal, wherein the file contains information related to the SD card that is connected to the mobile terminal;
    obtaining the information related to the SD card after reading the file,
    request first additional information to the SD card in order to launch an application in the SD card, wherein the first additional information is related to feature information of the SD card for launching the application;
    requesting second additional information to the mobile terminal in order to launch the application in the SD card, wherein the second additional information is related to feature information of the mobile terminal indicating a type of the mobile terminal and a size of the mobile terminal's screen;
    selecting the application based on the information related to the SD card, the first additional information and the second additional information, wherein the selected application is a most suitable application operable in the SD card after evaluating capabilities of the SD card and the mobile terminal; and
    sending a command to launch the selected application to the SD card, wherein data resulting from running the selected application is forwarded to the mobile terminal such that the mobile terminal can be customized using the resulting data.

* * * * *